(12) United States Patent
Shotey et al.

(10) Patent No.: US 6,583,358 B1
(45) Date of Patent: *Jun. 24, 2003

(54) UNIVERSAL COVER PLATE

(76) Inventors: Michael J. Shotey, 7272 E. Gainey Ranch Rd., #35, Scottsdale, AZ (US) 85258; Marcus J. Shotey, 10050 E. Mt. View Lake Dr., #47, Scottsdale, AZ (US) 85258; Edgar W. Maltby, 2063 Leisure World, Mesa, AZ (US) 85206

( * ) Notice: Subject to any disclaimer, the term of this patent is extended or adjusted under 35 U.S.C. 154(b) by 0 days.

This patent is subject to a terminal disclaimer.

(21) Appl. No.: 10/066,071

(22) Filed: Feb. 1, 2002

Related U.S. Application Data

(63) Continuation of application No. 09/657,352, filed on Sep. 7, 2000, now Pat. No. 6,441,307.

(51) Int. Cl.$^7$ ................................................. H02G 3/14
(52) U.S. Cl. ........................... 174/66; 174/67; 220/241; 220/242
(58) Field of Search .............................. 174/66, 67, 50; 220/241, 242, 3.8; 312/328

(56) References Cited

U.S. PATENT DOCUMENTS

| | | | |
|---|---|---|---|
| 854,046 | A | 5/1907 | La Paugh |
| 932,601 | A | 8/1909 | Corbett |
| 943,958 | A | 10/1909 | Wheeler |
| 946,646 | A | 1/1910 | Pratt |
| 1,228,731 | A | 6/1917 | Abbott et al. |
| 1,759,300 | A | 5/1930 | Cunningham |
| 1,784,277 | A | 12/1930 | Darlington |
| 2,043,865 | A | 6/1936 | Place |
| 2,321,640 | A | 6/1943 | Adkins |
| 2,596,236 | A | 5/1952 | Glosier |
| 2,966,998 | A | 1/1961 | Schwartz |
| 3,432,611 | A | 3/1969 | Gaines et al. |
| 3,437,738 | A | 4/1969 | Wagner |
| 3,438,534 | A | 4/1969 | Zerwes |
| 3,518,356 | A | 6/1970 | Friedman |
| 3,530,230 | A | 9/1970 | Cormier et al. |
| 3,544,703 | A | 12/1970 | Jones |
| 3,895,179 | A | 7/1975 | Wyatt |
| 3,965,287 | A | 6/1976 | Mueller |
| 4,032,030 | A | 6/1977 | Bass et al. |
| 4,500,746 | A | 2/1985 | Meehan |
| 4,737,599 | A | 4/1988 | Fontaine |
| 4,757,908 | A | 7/1988 | Medlin, Sr. |
| 4,833,277 | A | 5/1989 | Jacoby, Jr. et al. |
| 4,844,275 | A | 7/1989 | Schnell et al. |
| 4,998,635 | A | 3/1991 | Vink et al. |
| 5,072,848 | A | 12/1991 | Pipis et al. |
| 5,178,350 | A | 1/1993 | Vink et al. |
| 5,362,924 | A | 11/1994 | Correnti |
| 5,763,831 | A | 6/1998 | Shotey et al. |
| 5,804,764 | A * | 9/1998 | Gretz ............................ 174/53 |
| 6,025,557 | A * | 2/2000 | Daoud ....................... 174/65 G |
| 6,112,927 | A * | 9/2000 | Gretz ......................... 174/66 X |
| 6,276,962 | B1 * | 8/2001 | Gaines ....................... 174/66 X |

* cited by examiner

Primary Examiner—Dean A. Reichard
Assistant Examiner—Dhiru R Patel
(74) Attorney, Agent, or Firm—Schmeiser, Olsen & Watts LLP

(57) ABSTRACT

An electrical cover plate includes a base having a planar member. A first set of removable tabs is connected to the base so that removal of the first set of removable tabs forms a first set aperture, and a second set of removable tabs is connected to the base so that removal of the second set of removable tabs forms a second set aperture. The first set aperture and the second set aperture may each be bounded by an aperture periphery line so that the aperture periphery lines intersect. Also, the first tab set and the second tab set may have at least one tab in common, and each tab set may be bounded by a tab set periphery line so that the tab set periphery lines intersect. The tabs may be connected to the base by grooved connectors, connecting tabs, or other connections that removably connect the tabs to the base. The apertures may be shaped and positioned to receive a variety of specified electrical devices, such as round electrical sockets, duplex outlet sockets, ground-fault circuit interrupt sockets, or light switches.

28 Claims, 10 Drawing Sheets

UNIVERSAL COVER PLATE

CROSS REFERENCE TO RELATED APPLICATIONS

This application is a continuation application of the earlier patent application entitled "UNIVERSAL COVER PLATE," Ser. No. 09/657,352, filed Sep. 7, 2000, which issued as U.S. Pat. No. 6,441,307, the disclosures of which are hereby incorporated herein by reference

BACKGROUND OF THE INVENTION

1. Technical Field

This invention relates generally to a cover plate for electrical outlets, and more particularly to a universal cover plate that can be converted into a desired specific cover plate by detaching removable tabs.

2. Background Art

Cover plates enclose outlets behind a wall, thereby preventing inadvertent access to the electrically conductive elements of the outlets and hiding the unattractive wiring. The electrical devices attached at the outlet vary, and consequently cover plates of many varieties are known. For example, electric sockets, both standard and ground fault current interrupts; light switches, both toggle and rocker plates; and cable television or telephone ports may be wired at a given outlet. The outlets may be used for indoor or outdoor weatherproof wiring, or may require a locked cover.

Each type of outlet has a different type of cover plate configured for it. To install or service the outlets, an electrician must carry several types of cover plates to each site, necessitating the ordering and inventorying of many types of cover plates. This is time-consuming, expensive and inefficient. It is desirable, therefore, to have a universal cover plate to accommodate most commonly-encountered outlets.

To this end, a partial solution to the problem is known in the art including a three-piece cover plate with interchangeable parts. The base of this device has two pieces, a frame having a rectangular aperture and an insert that fills the aperture. Several versions of inserts are available, depending on the type of device to be wired. For example, one insert accommodates a duplex electrical socket and a separate insert accommodates a ground-fault circuit interrupt. The base is hinged at one end to receive a mated lid, thereby creating a hinged enclosure. The desired insert is chosen, inserted into the aperture of the frame, the lid attached, and the cover plate attached to the wall. To use this device for various types of outlets multiple parts must be carried by the electrician, including multiple inserts, bases, and lids. The prior art therefore does not solve the problem of having to order, stock and carry many different parts. Furthermore, the variety of cover plates is limited to the number of inserts, and only a single-axis hinged lid is known, and the base-lid pair does not allow for a base without a lid.

U.S. Pat. No. 5,763,831 to Shotey, which issued on Jun. 9, 1998, (the '831 patent) is incorporated herein by reference for its supportive teachings. The '831 patent is a significant advancement toward a practical cover plate that is convertible between different specific cover plate configurations. Shotey discloses a cover plate having tabs that can be removed to convert the cover plate to different specific cover plate configurations. However, the embodiments disclosed in the '831 patent are each able to be converted to only a limited number of specific cover plate configurations.

DISCLOSURE OF INVENTION

Therefore, there existed a need to provide a practical cover plate that is convertible between several different specific configurations. The present invention provides such a cover plate that is convertible between several different configurations without the need for an excessive number of parts.

According to the present invention, an electrical cover plate includes a base having a planar member. A first set of removable tabs is connected to the base so that removal of the first set of removable tabs forms a first set aperture, and a second set of removable tabs is connected to the base so that removal of the second set of removable tabs forms a second set aperture. The first set aperture and the second set aperture may each be bounded by an aperture periphery line so that the aperture periphery lines intersect. Also, the first tab set and the second tab set may have at least one tab in common, and each tab set may be bounded by a tab set periphery line so that the tab set periphery lines intersect. The tabs may be connected to the base by grooved connectors, connecting tabs, or other connections that removably connect the tabs to the base. The intersecting aperture periphery lines and tab set periphery lines and the corresponding overlapping areas of adjacent potential apertures allows the base to be converted to a much larger variety of configurations without requiring additional parts.

The base plate can include more than two tab sets that can be removed to form even more varieties of apertures. The apertures may be shaped and positioned to receive a variety of specified electrical devices, such as round electrical sockets, duplex outlet sockets, ground-fault circuit interrupt sockets, or light switches. The base may include removable hinge members on multiple substantially non-parallel sides that are adapted to mate with removable hinge members of a cover. Also, the base may define a head aperture that is shaped and positioned to receive the head of a fastener and a shank aperture that is shaped and positioned to receive the shank of the fastener, but not the head of the fastener.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

MODES FOR CARRYING OUT THE INVENTION

Figure 1:
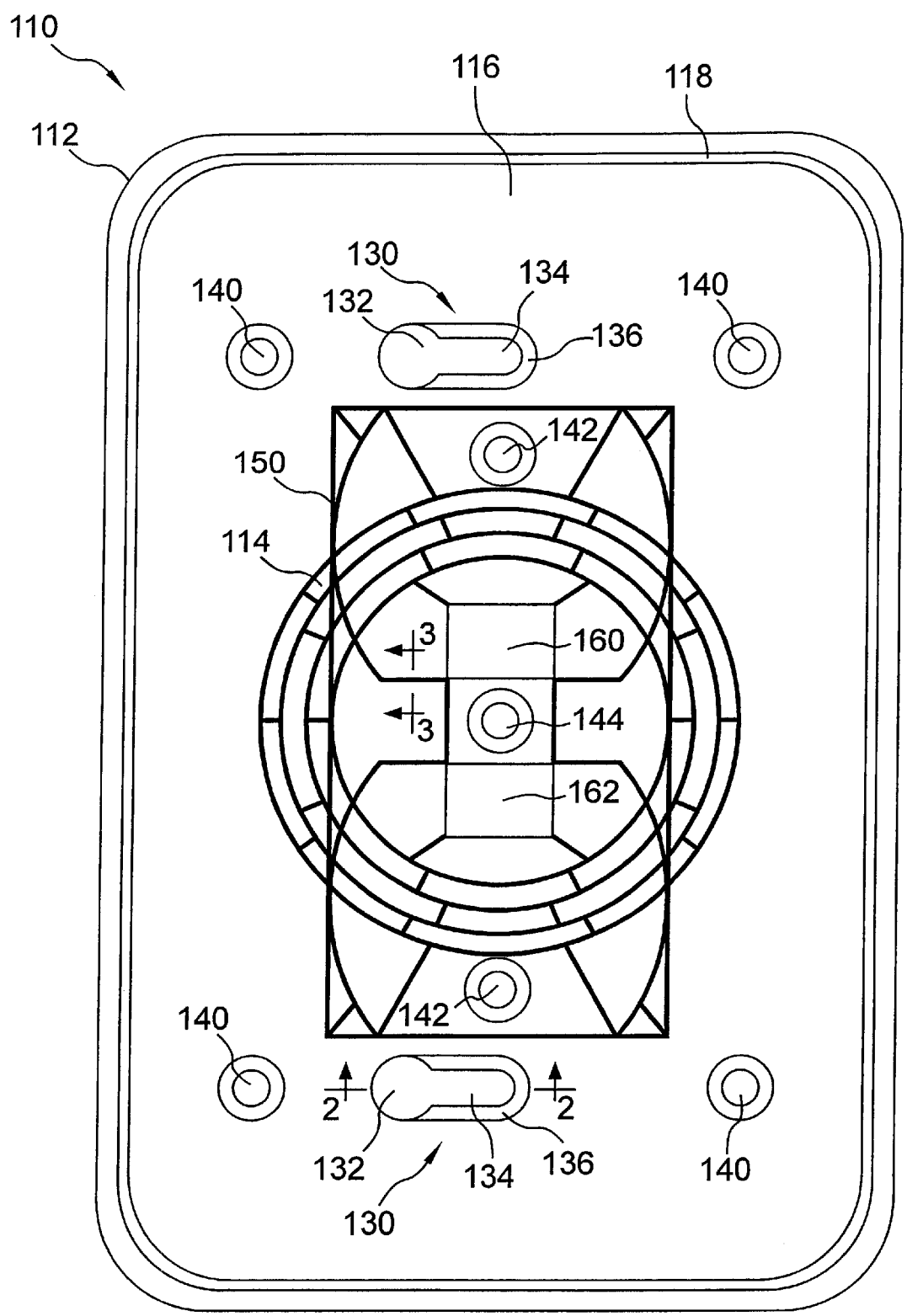
FIG. 1 is a front view of a base for a cover plate according to an embodiment of the present invention without hinge members thereon.

Referring to FIG. 1, a cover plate 110 includes a generally rectangular planar base 112 and plural removable tabs 114. Tabs 114 are preferably integral with base 112. However, they may be non-integral tabs such as snap-in tabs. A different set of tabs may be removed, such as by cutting, sawing, or prying, to produce each of a top duplex aperture, a bottom duplex aperture, a light switch aperture, and several different sizes of single round apertures. Each aperture is bounded by a corresponding aperture periphery line, and each set of tabs is bounded by a corresponding tab set periphery line. Unlike the embodiments of the '831 patent, the tab set periphery lines and the aperture periphery lines corresponding to different configurations intersect so that the areas of potential apertures overlap. In the embodiments of the '831 patent, potential aperture areas were nested within each other, but the aperture periphery lines did not intersect. The intersecting aperture periphery lines and the corresponding overlapping areas of adjacent potential apertures allows base 112 to be converted to a much larger variety of configurations without requiring additional parts.

In the embodiment shown in FIG. 1, cover plate 110 does not include a cover. However, as described below, a base similar to base 112 may include hinge members so that a cover could be attached to the base. Base 112 preferably includes a planar member 116 and a continuous flange 118 that extends from the periphery of planar member 116 and that is generally perpendicular to planar member 116.

Figure 2:
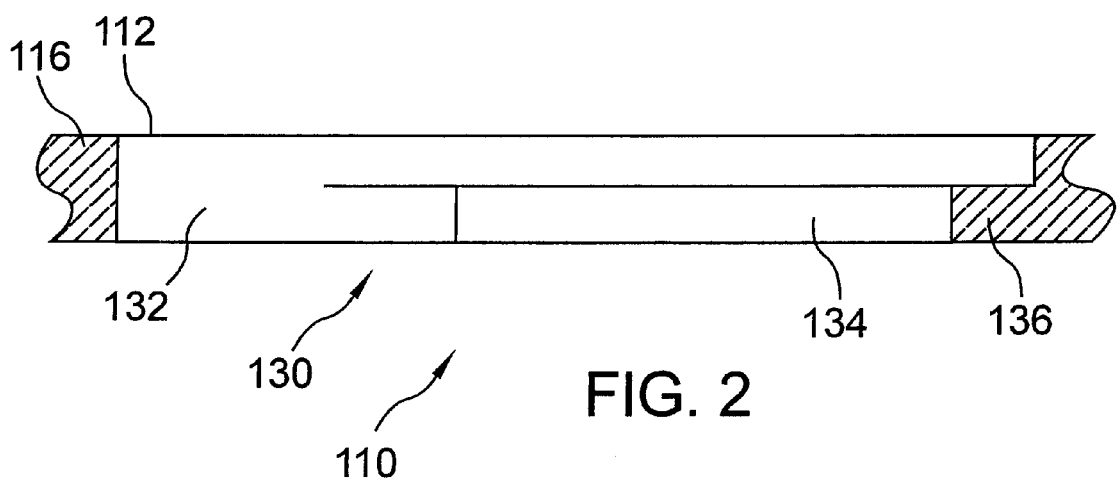
FIG. 2 is a broken away sectional view of a key hole taken along line 2—2 of FIG. 11

Referring to FIGS. 1–2, base 112 defines various holes for receiving mounting screws. Different holes may be used depending on the configuration of the holes to which cover plate 110 will be secured. Base 112 defines top and bottom key holes 130. Each key hole 130 preferably includes a head aperture or hole 132 that extends fully through planar member 116 of base 112. Head aperture 132 is preferably sized to receive a head of a fastener such as a mounting screw. A shank aperture or slot 134 extends through planar member 116 and extends to the side from head aperture 132. Preferably shank aperture 134 is sized so that it can receive a shank of a fastener such as a mounting screw, but so that it cannot receive the head thereof. Shank aperture 134 is bounded on either side by a shoulder 136.

Referring back to FIG. 1, base 112 also defines box screw holes 140 for receiving mounting screws. Also, removable tabs 114 define top and bottom mounting screw holes 142 and a center mounting screw hole 144. Different mounting screw holes will be utilized depending on the configuration. For example, in the duplex configuration the center mounting hole 144 may receive a mounting screw, while in a light switch configuration top and bottom mounting screw holes 142 might receive mounting screws. Other configurations of mounting holes may also be used with the present invention.

Figure 3:
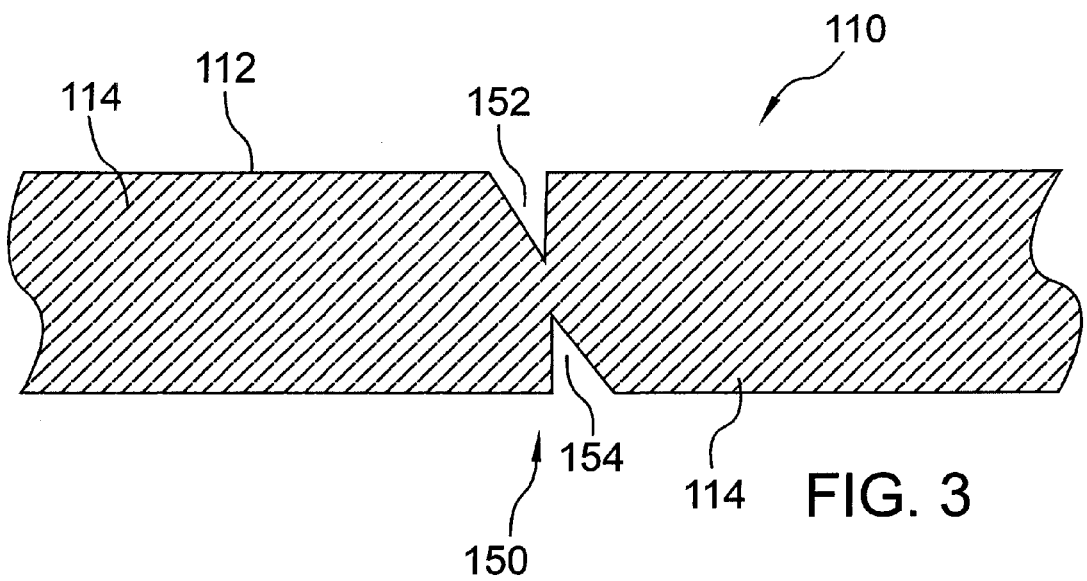
FIG. 3 is a broken away sectional view of a preferred grooved connector for a polymeric base taken along line 3—3 of FIG. 1.

Removable tabs 114 are preferably connected to each other and to base 112 by grooved connectors 150 (shown by dark lines in FIGS. 1 and 5–9). Grooved connectors 150 define removable tabs 114 since removal of tabs 114 is accomplished by breaking the material along grooved connectors 150. The dimensions and shape of the grooved connectors 150 will preferably vary depending on the material used for tabs 114 and base 112. For example, referring to FIG. 3 if base 112 and tabs 114 are made from a polymer such as polycarbonate, each grooved connector 150 preferably includes a front groove 152 extending inwardly from the front side of base 112 and an opposing rear groove 154 extending inwardly from the rear side of base 112. As an example, tabs 114 may be about 0.1 inch thick and front groove 152 may extend toward the rear from about 0.04 inch to about 0.05 inch, while rear groove 154 may extend toward the front from about 0.02 inch to about 0.04 inch. It may be preferably to have the outer grooved connectors have grooves that are not as deep as the grooves of the inner grooved connectors so that the outer tabs will not be inadvertently removed when removing the inner tabs. For example, the outermost grooved connectors may include a front groove that extends rearwardly about 0.04 inch and a rear groove that extends toward the front about 0.02 inch, and the inner grooved connectors may include a front groove that extends rearwardly about 0.05 inch and a rear groove that extends toward the front about 0.04 inch. For all the grooved connectors 150, a balance must be achieved between easy removal of tabs 114 and sufficient strength in the connections of the tabs 114 that remain after the selected tab set (or sets) is removed. If such a balance is achieved the tabs may be easily removed by breaking the material along the grooved connectors that connect the tabs to base 112.

Figure 4:
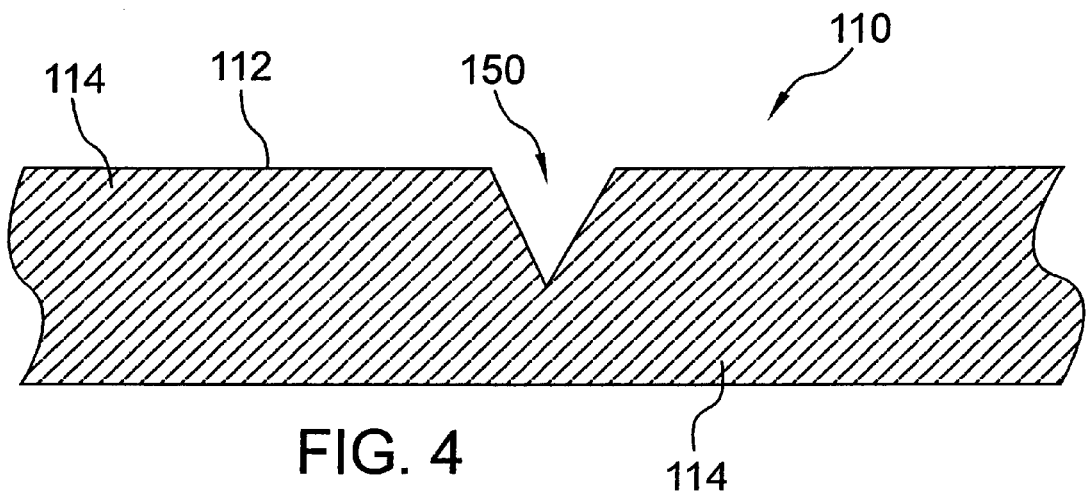
FIG. 4 is a broken away sectional view of a preferred grooved connector for a metallic base taken along line 3—3 of FIG. 1.

Referring to FIG. 4, if base 112 and tabs 114 are metallic, such as zinc, aluminum, or magnesium, each grooved connector 150 preferably includes only a front groove. As an example, the front groove for a zinc base 112 that has tabs 114 that are about 0.037 thick, not including any paint or finishing that may be applied, includes a grooved connector 150 that extends rearwardly about 0.017 inch. As with a polymer base, it may be preferable to have the outer grooved connectors of a metallic base not be as deep as the inner grooved connectors so that the outer tabs will not be inadvertently removed when removing the inner tabs.

Figure 5:
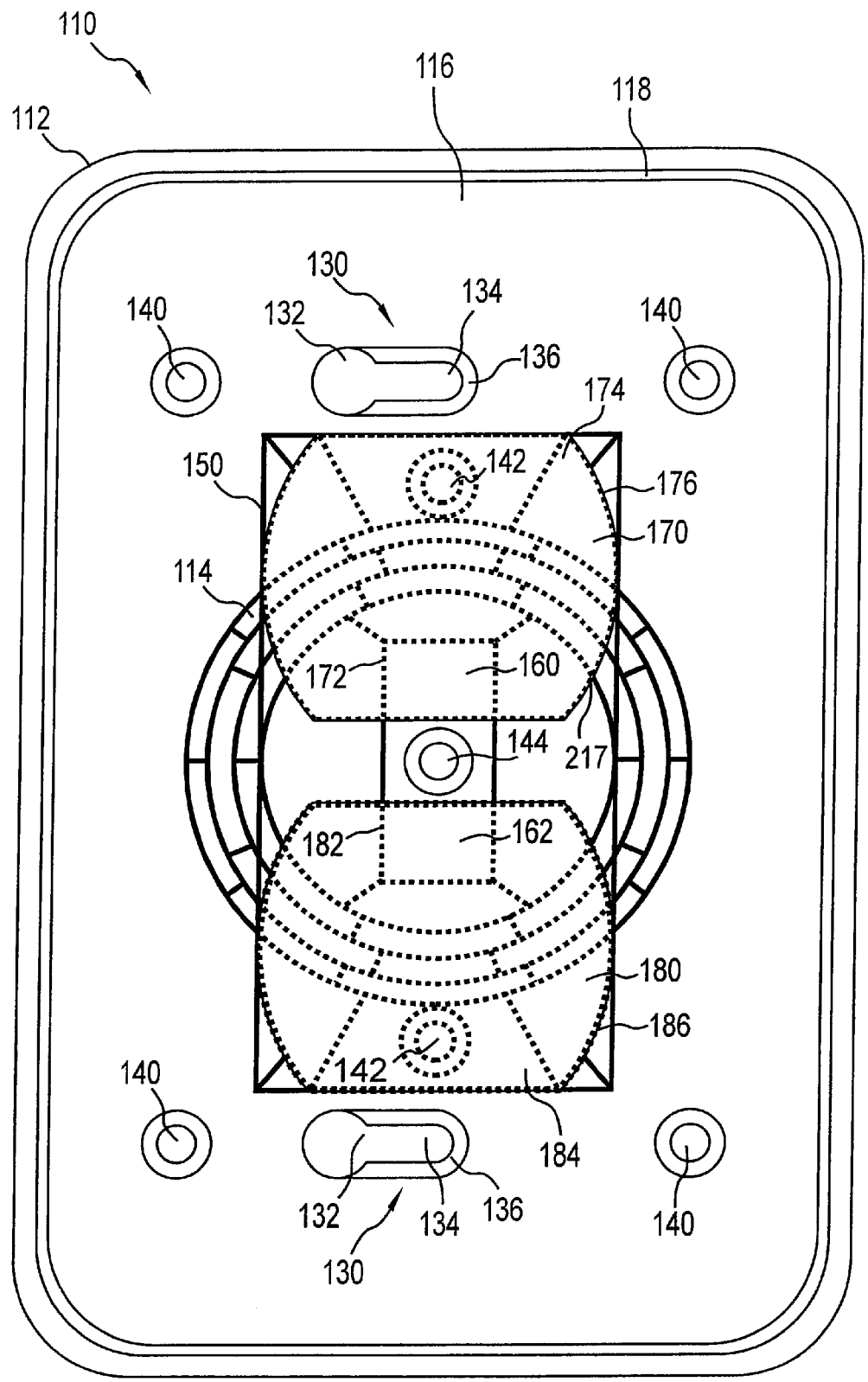
FIG. 5 is a front view the base of FIG. 1 showing the top duplex tab set and aperture and the bottom duplex tab set and aperture in dashed lines.

Referring back to FIG. 1, tabs 114 define a top initial aperture 160 and a bottom initial aperture 162. Such initial apertures 160, 162 are not necessary, but they are preferable in that they facilitate easy removal of removable tabs 114. Referring to FIG. 5, a top duplex tab set 170 shown in dashed lines preferably includes multiple tabs of removable tabs 114 and is bounded by a top duplex tab set periphery line 172 that extends about the periphery of top duplex tab set 170. Removal of top duplex tab set 170 converts top initial aperture 160 into a top duplex aperture 174 that is shaped and positioned to receive the top electrical socket of a duplex outlet. Preferably, top duplex aperture 174 is a substantially oval shape such as is common for duplex electrical sockets. Top duplex aperture 174 is bounded by a top duplex aperture periphery line 176 that extends about the periphery of top duplex aperture 174 when top duplex tab set 170 has been removed. It should be recognized that terms such as top and bottom as used herein are used for convenience in referring to the drawings and the cover plate could be oriented any of several different ways, such as a horizontal, rather than vertical, orientation of a duplex outlet.

A bottom duplex tab set 180 shown in dashed lines preferably includes multiple tabs of removable tabs 114 and is bounded by a bottom duplex tab set periphery line 182 that extends about the periphery of bottom duplex tab set 180. Removal of bottom duplex tab set 180 converts bottom initial aperture 162 into a bottom duplex aperture 184 that is shaped and positioned to receive the bottom electrical socket of a duplex outlet. Preferably, bottom duplex aperture 184 is a substantially oval shape such as is common for duplex electrical sockets. Bottom duplex aperture 184 is bounded by a bottom duplex aperture periphery line 186 that extends about the periphery of bottom duplex aperture 184 when bottom duplex tab set 180 has been removed.

After removing bottom duplex tab set 180 and top duplex tab set 170, base 112 can be secured to a surface so that duplex sockets are received by top duplex aperture 174 and bottom duplex aperture 184 by mounting screws extending through key holes 130, box screw holes 140, or center mounting screw hole 144 and into corresponding backing hole(s) that are preferably threaded to mate with the mounting screw(s).

If key holes 130 are used, a screw or other fastener can be partially turned into each backing hole. Base 112 can then be oriented so that each head aperture 132 of each key hole 130 is aligned with a corresponding fastener head. Base 112 can then be pushed toward the backing holes so that each fastener head extends through a corresponding head aperture 132. Base 112 can then be slid to the left so that each shank aperture 134 receives the shank of the corresponding fastener. Each fastener can then be turned farther into the backing hole until head of the fastener snugly abuts the shoulder 136 of the corresponding key hole 130. Base 112 can be easily removed by partially loosening each of the fasteners, sliding base 112 to the right so that the head of each fastener aligns with the corresponding head aperture 132, and removing base 112 so that each fastener head slides through a corresponding head aperture 132. Thus, by using key holes 130, base 112 can be mounted and removed without fully removing the fasteners from the backing holes.

Figure 6:
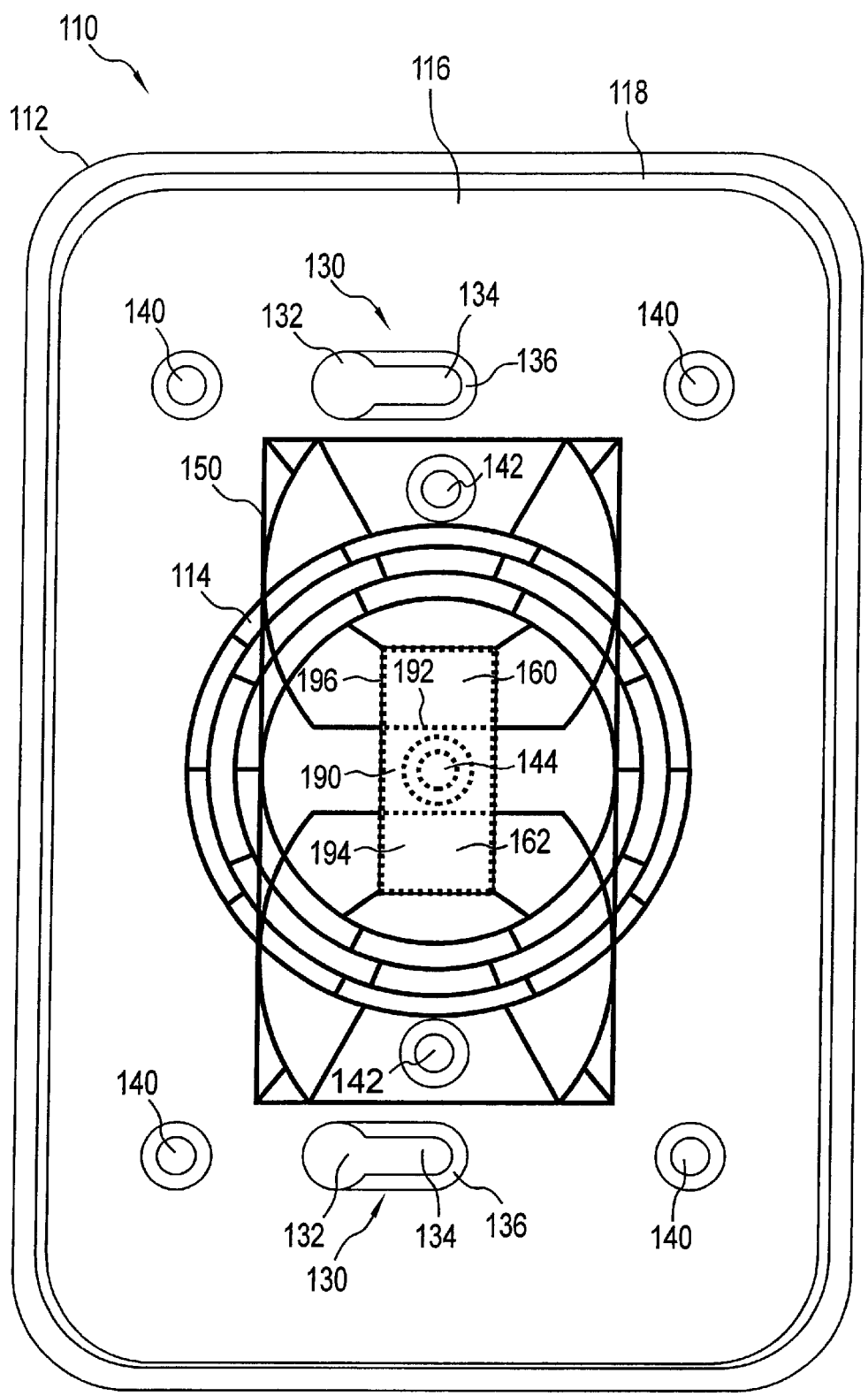
FIG. 6 is a front view the base of FIG. 1 showing the light switch tab set and aperture in dashed lines.

Referring now to FIG. 6, a light switch tab set 190 shown in dashed lines preferably includes a single removable tab in the center of base 112 that is bounded by a light switch tab set periphery line 192 that extends about the periphery of light switch tab set 190. Removal of light switch tab set 190 converts bottom initial aperture 162 and top initial aperture 160 into a light switch aperture 194 that is shaped and positioned to receive a light switch. Preferably, light switch aperture 194 is a substantially rectangular shape. Light switch aperture 194 is bounded by a light switch aperture periphery line 196 that extends about the periphery of light switch aperture 194 when light switch tab set 190 has been removed.

After removing light switch tab set 190, base 112 can be secured to a surface so that a light switch is received by light switch aperture 194 by mounting screws extending through key holes 130, box screw holes 140, or top and bottom mounting screw holes 142 and into corresponding backing holes.

Figure 7:
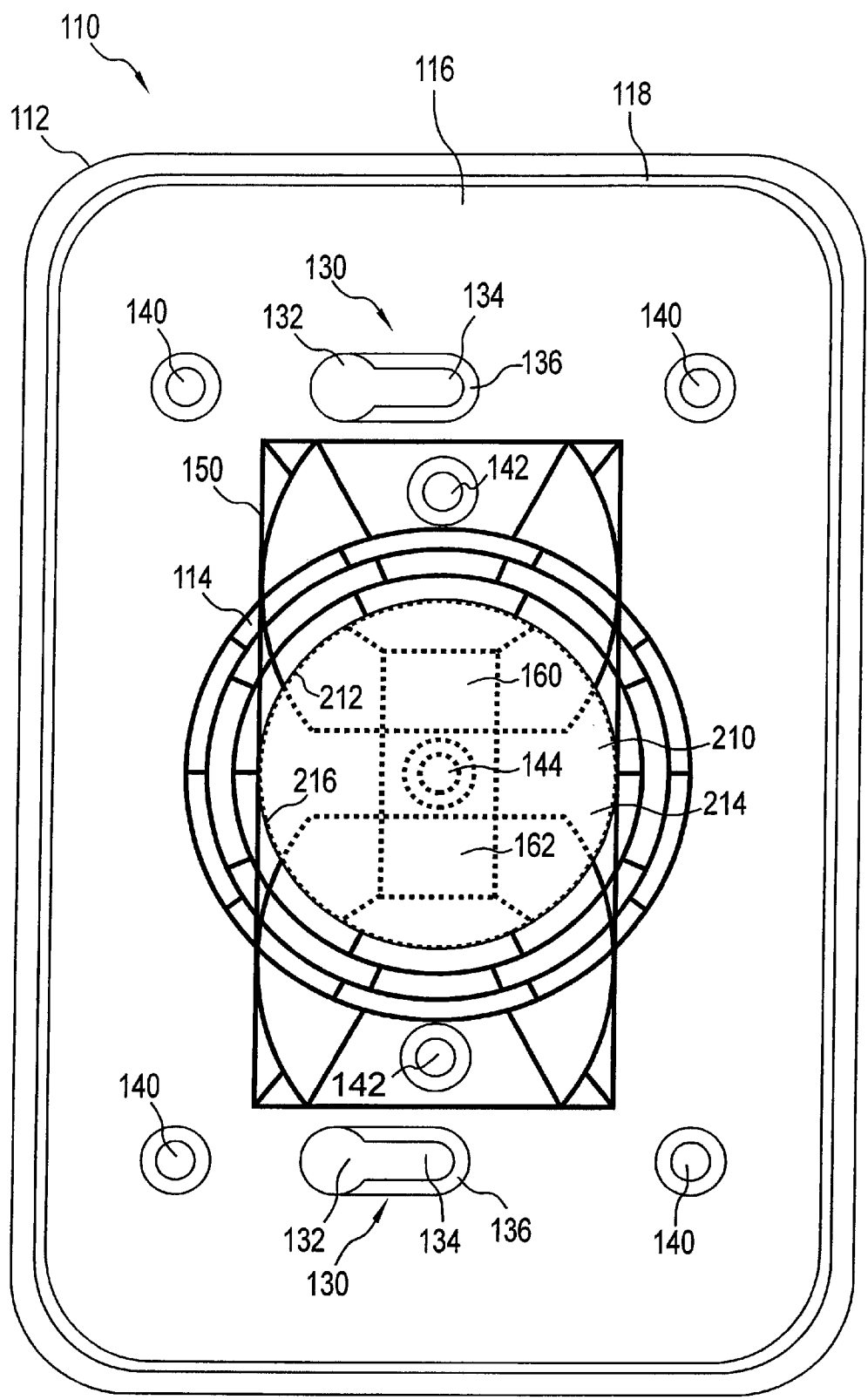
FIG. 7 is a front view the base of FIG. 1 showing the small single round tab set and aperture in dashed lines.

Referring now to FIG. 7, a small single round tab set 210 shown in dashed lines preferably includes multiple tabs of removable tabs 114 that are bounded by a small single round tab set periphery line 212 that extends about the periphery of small single round tab set 210. Removal of small single round tab set 210 converts bottom initial aperture 162 and top initial aperture 160 into a small single round aperture 214 that is shaped and positioned to receive a small single round electrical socket. Preferably, small single round aperture 214 is substantially circular in shape. Small single round aperture 214 is bounded by a small single round aperture periphery line 216 that extends about the periphery of small single round aperture 214 when small single round tab set 210 has been removed.

Note that the small single round aperture periphery line 216 intersects the periphery lines of other tab sets which each include one or more removeable tabs 114. There are numerous intersects between periphery lines surrounding each of the removeable tabs and tab sets. However, by example only and not by limitation, three specific examples of periphery line intersects may be found where the small single round aperture periphery line 216 intersects with a periphery line 182 of duplex outlet tab set 180 (FIG. 5) at point 217, with a periphery line of a tab 114 associated with a larger single round aperture at point 218 (FIG. 8), and with a periphery line 232 of a ground-fault circuit interrupt (GFCI) tab set 230 (FIG. 9) at point 219.

After removing small single round tab set 210, base 112 can be secured to a surface so that a small single round electrical socket, such as a 1⅜ inch single round electrical socket, is received by small single round aperture 214 by mounting screws extending through key holes 130, box screw holes 140, or top and bottom mounting screw holes 142 and into corresponding backing holes.

Figure 8:
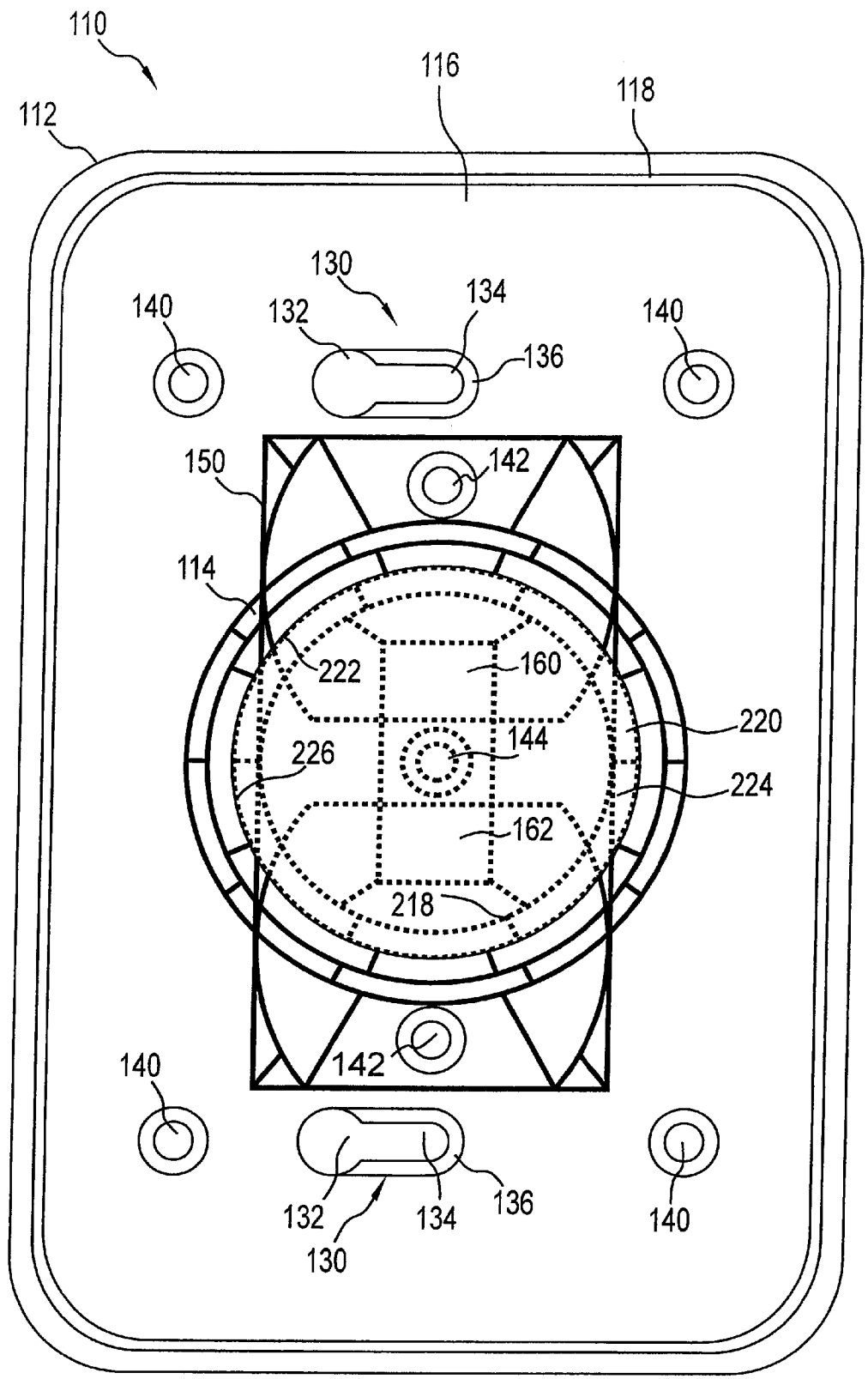
FIG. 8 is a front view the base of FIG. 1 showing a larger single round tab set and aperture in dashed lines.

Referring now to FIG. 8, a larger single round tab set 220 shown in dashed lines preferably includes multiple tabs of removable tabs 114 that are bounded by a larger single round tab set periphery line 222 that extends about the periphery of larger single round tab set 220. Removal of larger single round tab set 220 converts bottom initial aperture 162 and top initial aperture 160 into a larger single round aperture 224 that is shaped and positioned to receive a larger single round electrical socket. Preferably, larger single round aperture 224 is substantially circular. Larger single round aperture 224 is bounded by a larger single round aperture periphery line 226 that extends about the periphery of larger single round aperture 224 when larger single round tab set 220 has been removed.

After removing larger single round tab set 220, base 112 can be secured to a surface so that a larger single round electrical socket, such as a 1⅝ inch single round electrical socket, is received by larger single round aperture 224 by mounting screws extending through key holes 130, box screw holes 140, or top and bottom mounting screw holes 142 and into corresponding backing holes.

Successively larger apertures may be produced to receive successively larger single round electrical sockets, such as 1¾ and 2¼ inch single round electrical sockets, by removing tab sets that include larger single round tab set 220 plus one or more rings of removable tabs that surround larger single round tab set 220.

Figure 9:
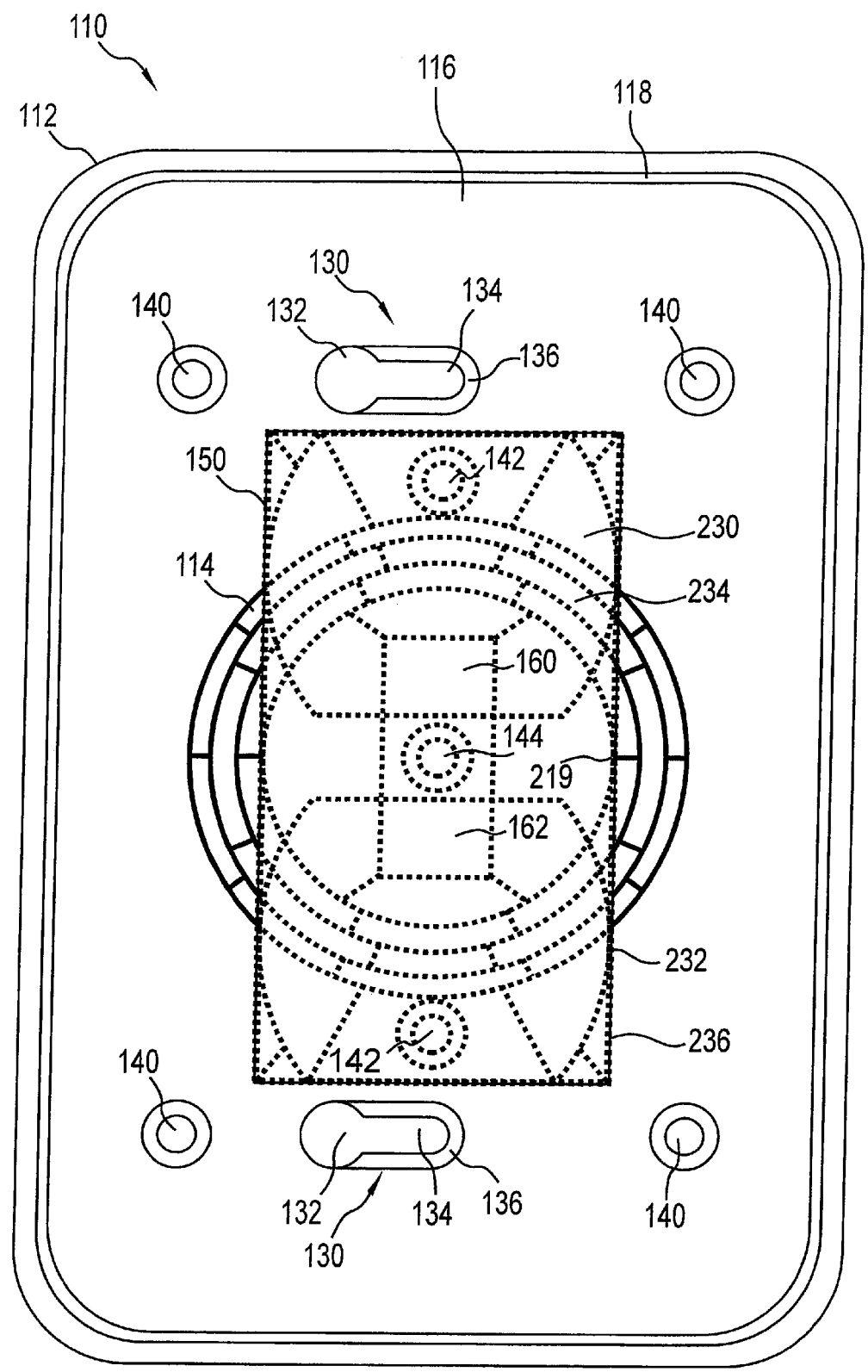
FIG. 9 is a front view the base of FIG. 1 showing the ground-fault circuit interrupt tab set and aperture in dashed lines.

Referring now to FIG. 9, a ground-fault circuit interrupt (GFCI) tab set 230 shown in dashed lines preferably includes multiple tabs of removable tabs 114 that are bounded by a GFCI tab set periphery line 232 that extends about the periphery of GFCI tab set 230. Removal of GFCI tab set 230 converts bottom initial aperture 162 and top initial aperture 160 into a GFCI aperture 234 that is shaped and positioned to receive a GFCI electrical socket. Preferably, GFCI aperture 234 is substantially rectangular. GFCI aperture 234 is bounded by a GFCI aperture periphery line 236 that extends about the periphery of GFCI aperture 234 when GFCI tab set 230 has been removed.

After removing GFCI tab set 230, base 112 can be secured to a surface so that a GFCI electrical socket is received by GFCI aperture 234 by mounting screws extending through key holes 130 or box screw holes 140 and into corresponding backing holes.

Some of the grooved connectors 150 define tab set periphery lines, but others are included to make adjacent tabs easier to remove. Examples of such grooved connectors include grooved connectors extending diagonally outwardly from the corners of light switch aperture 194 (see FIG. 6) and grooved connectors extending inwardly from the corners of GFCI aperture 234.

Base 112 and removable tabs 114 can be manufactured by die casting if base 112 and removable tabs 114 are made from a metal. Preferably, if base 112 and tabs 114 are made from metal, the metal is a corrosion-resistant metal, such as zinc or magnesium. Aluminum may also be preferred, although aluminum is not particularly resistant to corrosion in a salt water environment. Alternatively, base 112 and removable tabs 114 can be manufactured by injection molding if base 112 and removable tabs are made from a polymeric material, such as polycarbonate.

The large variety of configurations that can be made from base 112 without requiring additional parts is possible because several tab sets overlap so that many of the tabs are included in multiple tab sets. Also, several tab set periphery lines intersect and several aperture periphery lines intersect.

Figure 10:
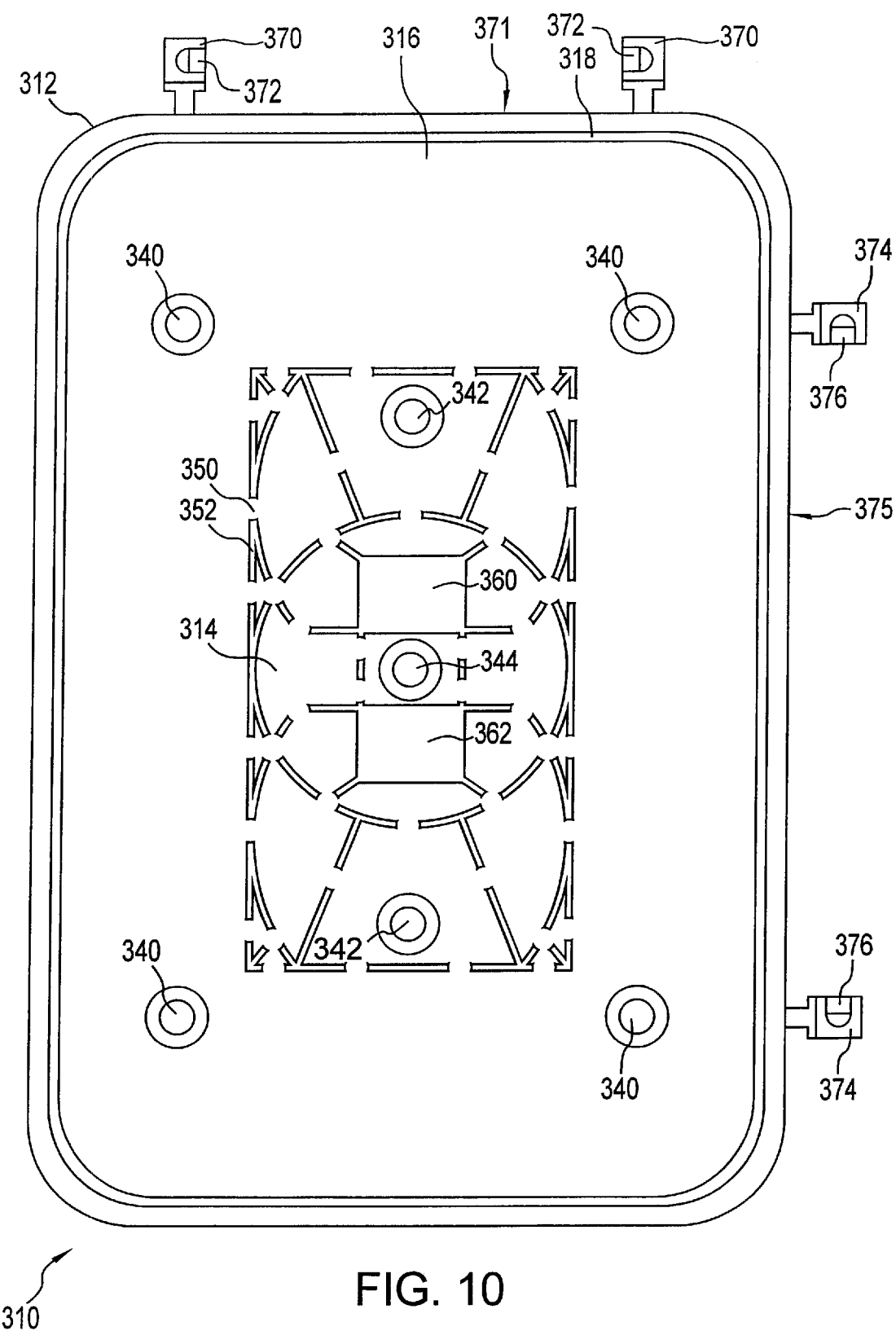
FIG. 10 is a front view of a base for a cover plate according to an embodiment of the present invention with hinge members thereon.

Referring to FIG. 10, a cover plate 310 includes a generally rectangular planar base 312 and plural removable tabs 314. Tabs 314 are preferably integral with base 312. A different set of tabs may be removed, such as by cutting, sawing, or prying, to produce each of a top duplex aperture, a bottom duplex aperture, a light switch aperture, and a single round aperture as described above with reference to cover plate 110. Each aperture is bounded a corresponding aperture periphery line, and each set of tabs is bounded by a corresponding tab set periphery line. Several of the aperture periphery lines intersect, and several of the tab set periphery lines intersect as described above.

Base 312 preferably includes a planar member 316 and a continuous flange 318 that extends from the periphery of planar member 316 and that is generally perpendicular to planar member 316.

Base 312 defines various holes for receiving mounting screws. Different holes may be used depending on the configuration of the holes to which cover plate 310 will be secured. Base 312 does not define key holes as does base 112 described above, but a base similar to base 312 could include key holes similar to those described above with reference to base 112. Base 312 does define box screw holes 340 for receiving mounting screws. Also, removable tabs 314 define top and bottom mounting screw holes 342 and a center mounting screw hole 344. As described above with reference to base 112, different mounting screw holes will be utilized depending on the configuration.

Removable tabs 314 are preferably connected to each other and to base 312 by connecting tabs 350 that span cut lines 352, which define removable tabs 314. Cut lines 352 are preferably apertures that extend through base 312. The dimensions, shape, and position of connecting tabs 350 will preferably vary depending on the material used for tabs 314, tabs 350, and base 312. It may be preferably to have the outer connecting tabs include more material than the inner connecting tabs so that the outer tabs will not be inadvertently removed when removing the inner tabs.

Tabs 314 define a top initial aperture 360 and a bottom initial aperture 362. Such initial apertures 360, 362 are not necessary, but they are preferable in that they facilitate easy removal of removable tabs 314. As with base 112 described above, removable tabs 314 of base 312 include a top duplex tab set, a bottom duplex tab set, a light switch tab set, a small single round tab set, and a GFCI tab set. However, base 312 does not include larger single round tab sets, although a base similar to base 312 could include such tab sets. Each tab set may be removed to form a corresponding aperture to receive the desired electrical outlet or switch. Also, many other combinations of tab sets may be included within bases according to the present invention. For example, a base similar to base 112 or base 312 may include removable tab sets that yield apertures to receive a rocker-type light switch, a modular phone jack, a cable television outlet, or other device. Also, such a base may include any of several different combinations of the tab sets described.

Base 312 includes a pair of detachable hinge members 370 that are attached to a shorter side 371 of base 312. Each hinge member 370 defines an aperture or hole 372 therein with an axis that is aligned with the corresponding shorter side 371. Base 312 also includes a pair of detachable hinge members 374 that are attached to a longer side 375 of base 312. Each hinge member 374 defines an aperture or hole 376 therein with an axis that is aligned with the corresponding longer side 375. Base 312 may be made from a polymer, such as polycarbonate, or a metal such as zinc, magnesium or aluminum. If base 312 is made from a polymer, it is preferably plastic injection molded. If base 312 is made from a metal, it is preferably made by metal stamping.

Figure 11:
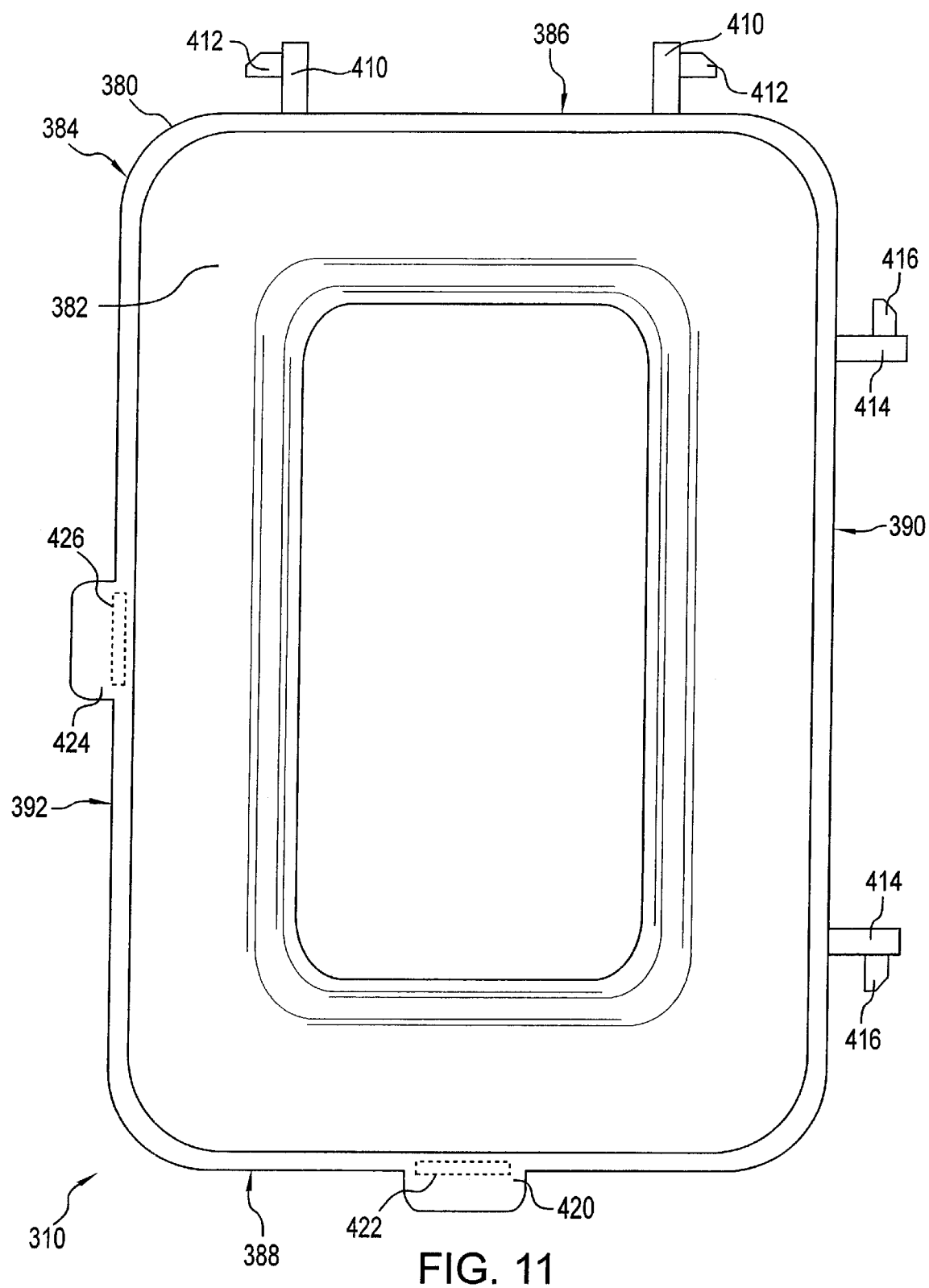
FIG. 11 is a front view of a cover for a cover plate according to an embodiment of the present invention with hinge members thereon.

Referring now to FIG. 11, cover plate 310 also includes a cover 380 that includes a domed top 382 extending from a peripheral edge 384. Peripheral edge 384 is generally rectangular and includes a short hinge side 386, an opposing short lock side 388, a long hinge side 390, and an opposing long lock side 392. Cover 380 includes a pair of removable hinge members 410 attached to short hinge side 386. Each removable hinge member 410 includes a pin 412 that is adapted to mate with a corresponding hole 372 in a hinge member 370 of base 312 (see FIG. 10). Cover 380 also includes a pair of removable hinge members 414 attached to long hinge side 390. Each removable hinge member 414 includes a pin 416 that is adapted to mate with a corresponding hole 376 in a hinge member 374 of base 312 (see FIG. 10).

Cover 380 includes a latch 420 attached to short lock side 388. Latch 420 includes a hook 422 that is biased to engage the periphery of base 312 (see FIG. 12). Cover 380 also includes a latch 424 attached to long lock side 392. Latch 424 includes a hook 426 that is biased to engage the periphery of base 312.

Cover 380 may be made from a polymer material such as polycarbonate by injection molding. Alternatively, it may be made from another type of material, such as zinc, aluminum or magnesium.

Figure 12:
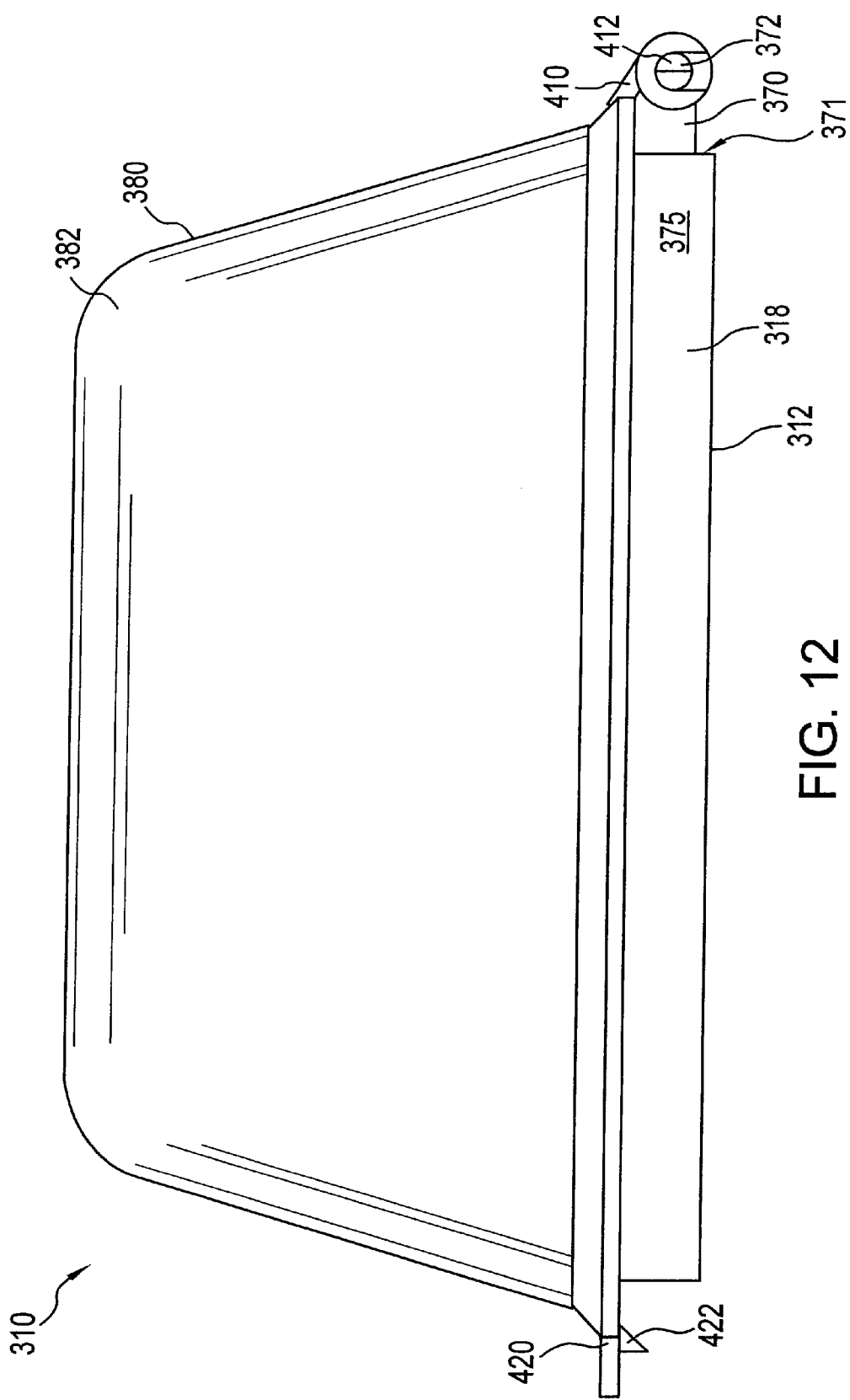
FIG. 12 is a side view of an assembled cover plate including the base of FIG. 10 and the cover of FIG. 11 with the hinge members along the long side of the base and cover having been removed.

Referring to FIGS. 10–12, cover plate 310 is shown wherein removable hinge members 374 attached to long side 375 of base 312 and removable hinge members 414 attached to long hinge side 390 of cover 380 have been removed. Preferably, removable hinge members 370, 374 are integral with base 312 and may be removed by cutting, prying, or sawing. Also, removable hinge members 410, 414 are preferably integral with cover 380 and may be removed by cutting, prying or sawing. After removable hinge members 374 and 414 have been removed, hinge members 370 attached to short side 371 of base 312 are snapped into position with hinge members 410 attached to short hinge side 386 of cover 380 so that holes 372 of hinge members 370 receive pins 412 of hinge members 410. Cover 380 may then be pivoted so that hook 422 of latch 420 engages the periphery of base 312. Latch 424 may be removed, or it may remain so that hook 426 of latch 424 also engages the periphery of base 312. Cover 380 may also include removable tabs (not shown) that can be removed to form apertures to receive cords or wires extending through cover 380 so that cover 380 may remain latched while a socket within cover plate 310 is being used. Cover plate 310 including cover 380 is particularly useful in outdoor settings where a weatherproof cover plate is desired. However, if cover 380 is not desired, all hinge members 370, 374, 410, and 414 may be removed and cover plate 310 can be used without cover 380.

Hinge members 370 of base 312 can be detached from hinge members 410 of cover 380 by snapping pins 412 out of engagement with holes 372 to remove cover 380 from base 312. Thus, a user can easily attach or detach cover 380 from base 312.

From the foregoing embodiments, it can be seen that the present invention provides a cover plate that is extremely versatile, without requiring additional parts. A cover plate may include a cover, although it does not necessarily need to do so. Also, sets of removable tabs may be removed to form apertures to receive a variety of electrical devices. The tab sets are bounded by tab set periphery lines that may intersect each other, and the resulting apertures are bounded by aperture periphery lines that may intersect each other. Thus, tab sets and potential apertures may overlap or they may include other tab sets or potential apertures. With such overlaps and intersections, the present invention provides a large variety of possible cover plate configurations without requiring a user to stock several different cover plate parts.

While the invention has been particularly shown and described with reference to preferred embodiments thereof, it will be understood by those skilled in the art that various changes in form and details may be made therein without departing from the spirit and scope of the invention. For example, some or all of the removable tabs could be connected to the base by snap-in connections rather than grooved connectors or connecting tabs.

What is claimed is:

1. An electrical cover plate comprising:
   a base comprising a planar member having a front side and a back side, the planar member defining an initial aperture passing through the front and back sides of the base;
   a first set of removable tabs comprising at least one removable tab, the first set of removable tabs connected to the base and bordering the initial aperture so that removal of the first set of removable tabs converts the initial aperture to a first set aperture, the first set of removable tabs being bounded by a first tab set periphery line; and
   a second set of removable tabs comprising at least one removable tab, the second set of removable tabs connected to the base and bordering the initial aperture so that removal of the second set of removable tabs converts the initial aperture to a second set aperture, the second set of removable tabs being bounded by a second tab set periphery line;
   wherein the first tab set periphery line and the second tab set periphery line intersect.

2. The cover plate of claim 1, wherein the first set of removable tabs and the second set of removable tabs have at least one removable tab in common.

3. The cover plate of claim 1, wherein the first set of removable tabs is bounded by a first tab set periphery line, wherein the second set of removable tabs is bounded by a second tab set periphery line, and wherein the first tab set periphery line intersects the second tab set periphery line.

4. The apparatus of claim 1, wherein at least one tab of the first set of removable tabs and at least one tab of the second set of removable tabs are integral with the base.

5. The cover plate of claim 4, wherein each tab of the first set of removable tabs is integral with the base and each tab of the second set of removable tabs is integral with the base.

6. The cover plate of claim 5, wherein each tab of the first set of removable tabs is connected to the base by at least one grooved connector and each tab of the second set of removable tabs is connected to the base by at least one grooved connector.

7. The cover plate of claim 5, wherein each tab of the first set of removable tabs is connected to the base by at least one connecting tab and each tab of the second set of removable tabs is connected to the base by at least one connecting tab.

8. The cover plate of claim 1, wherein the first set aperture is shaped and positioned to receive an electrical socket.

9. The cover plate of claim 8, wherein the first set aperture is shaped and positioned to receive a single round electrical socket.

10. An electrical cover plate comprising:
    a base comprising a planar member;
    a first set of removable tabs comprising at least one removable tab, so that removal of the first set of removable tabs forms a first set aperture that is shaped and positioned to receive a single round electrical socket when mounted on a single round electrical outlet, the first set of removable tabs being bounded by a first tab set periphery line;
    a second set of removable tabs comprising at least one removable tab, so that removal of the second set of removable tabs forms a second set aperture that is shaped and positioned to receive a first electrical socket of a duplex outlet when mounted on the duplex outlet, the second set of removable tabs being bounded by a second tab set periphery line;
    a third set of removable tabs comprising at least one removable tab, so that removal of the third set of removable tabs forms a third set aperture that is shaped and positioned to receive a second electrical socket of the duplex outlet when mounted on the duplex outlet, the third set of removable tabs being bounded by a third tab set periphery line; and
    a fourth set of removable tabs comprising at least one removable tab, so that removal of the fourth set of removable tabs forms a fourth set aperture that is shaped and positioned to receive a ground-fault circuit interrupt socket when mounted on a ground-fault circuit interrupt electrical outlet, the fourth set of removable tabs being bounded by a fourth tab set periphery line.

11. An electrical cover plate comprising:
    a base comprising a planar member, the planar member defining an initial aperture passing through the base;
    a first set of removable tabs comprising at least one removable tab, the first set of removable tabs connected to the base and bordering the initial aperture sol that removal of the first set of removable tabs converts the initial aperture to a first set aperture that is substantially circular, the first set of removable tabs being bounded by a first tab set periphery line; and
    a second set of removable tabs comprising at least one removable tab, the second set of removable tabs connected to the base and bordering the initial aperture so that removal of the second set of removable tabs converts the initial aperture to a second set aperture, the second set of removable tabs being bounded by a second tab set periphery line;

wherein the first tab set periphery line and the second tab set periphery line intersect.

12. The cover plate of claim 11, wherein the first set of removable tabs and the second set of removable tabs have at least one removable tab in common.

13. The cover plate of claim 11, wherein the base further comprises a first side, a second side that is substantially nonparallel with the first side, at least one removable hinge member attached to the first side of the base, and at least one removable hinge member attached to the second side of the base; and wherein the cover plate further comprises a cover for mating with the base, the cover comprising a first side and a second side corresponding respectively to the first side of the base and the second side of the base, the cover further comprising at least one removable hinge member attached to the first side of the cover and adapted to mate with the at least one removable hinge member of the first side of the base, and at least one removable hinge member attached to the second side of the cover and adapted to mate with the at least one removable hinge member of the second side of the base.

14. The cover plate of claim 11, wherein the base defines a head aperture that is shaped and positioned to receive the head of a fastener and a shank aperture that is shaped and positioned to receive the shank of the fastener, but not the head of the fastener.

15. The apparatus of claim 11, wherein each tab of the first set of removable tabs is integral with the base and each tab of the second set of removable tabs is integral with the base.

16. The cover plate of claim 15, wherein each tab of the first set of removable tabs is connected to the base by at least one grooved connector and each tab of the second set of removable tabs is connected to the base by at least one grooved connector.

17. The cover plate of claim 15, wherein each tab of the first set of removable tabs is connected to the base by at least one connecting tab and each tab of the second set of removable tabs is connected to the base by at least one connecting tab.

18. The cover plate of claim 13, wherein the first set aperture is shaped and positioned to receive a single round electrical socket and wherein the second set aperture is shaped and positioned to receive an electrical socket selected from the group consisting of a socket of a duplex outlet and a ground-fault circuit interrupt socket.

19. The cover plate of claim 18, wherein the second set aperture is shaped and positioned to receive a socket of a duplex outlet.

20. The cover plate of claim 18, wherein the second set aperture is shaped and positioned to receive a ground-fault circuit interrupt socket.

21. An electrical cover plate comprising:
a base comprising a planar member;
a first set of removable tabs comprising at least one removable tab, so that removal of the first set of removable tabs forms a first set aperture that is shaped and positioned to receive a single round electrical socket, the first set of removable tabs being bounded by a first tab set periphery line;
a second set of removable tabs comprising at least one removable tab, so that removal of the second set of removable tabs forms a second set aperture that is shaped and positioned to receive a first electrical socket of a duplex outlet, the second set of removable tabs being bounded by a second tab set periphery line;
a third set of removable tabs comprising at least one removable tab, so that removal of the third set of removable tabs forms a third set aperture that is shaped and positioned to receive a second electrical socket of the duplex outlet, the third set of removable tabs being bounded by a third tab set periphery line; and
a fourth set of removable tabs comprising at least one removable tab, so that removal of the fourth set of removable tabs forms a fourth set aperture that is shaped and positioned to receive a ground-fault circuit interrupt socket, the third set of removable tabs being bounded by a fourth tab periphery line.

22. The cover plate of claim 21, wherein the first tab set periphery line and the second tab set periphery line intersect and wherein the first tab set periphery line and the third tab set periphery line intersect.

23. The cover plate of claim 22, wherein the first tab set periphery line and the fourth tab set periphery line intersect.

24. The cover plate of claim 21, wherein each tab of the first set of removable tabs is integral with the base and is connected to the base by at least one grooved connector, each tab of the second set of removable tabs is integral with the base and is connected to the base by at least one grooved connector, each tab of the third set of removable tabs is integral with the base and is connected to the base by at least one grooved connector, and each tab of the fourth set of removable tabs is integral with the base and is connected to the base by at least one grooved connector.

25. The cover plate of claim 21, wherein each tab of the first set of removable tabs is integral with the base and is connected to the base by at least one connecting tab, each tab of the second set of removable tabs is integral with the base and is connected to the base by at least one connecting tab, each tab of the third set of removable tabs is integral with the base and is connected to the base by at least one connecting tab, and each tab of the fourth set of removable tabs is integral with the base and is connected to the base by at least one connecting tab.

26. The cover plate of claim 21, further comprising a fifth set of removable tabs comprising at least one removable tab, so that removal of the fifth set of removable tabs forms a fifth set aperture that is shaped and positioned to receive a light switch, the fifth set of removable tabs being bounded by a fifth tab set periphery line.

27. The cover plate of claim 21, wherein the base further comprises a first side, a second side that is substantially nonparallel with the first side, at least one removable hinge member integral with the first side of the base, and at least one removable hinge member integral with the second side of the base; and wherein the cover plate further comprises a cover for mating with the base, the cover comprising a first side and a second side corresponding respectively to the first side of the base and the second side of the base, the cover further comprising at least one removable hinge member integral with the first side of the cover and adapted to mate with the at least one removable hinge member of the first side of the base, and at least one removable hinge member integral with the second side of the cover and adapted to mate with the at least one removable hinge member of the second side of the base.

28. The cover plate of claim 21, wherein the base defines a head aperture that is shaped and positioned to receive the head of a fastener and a shank aperture that is shaped and positioned to receive the shank of the fastener, but not the head of the fastener.

* * * * *

UNITED STATES PATENT AND TRADEMARK OFFICE
CERTIFICATE OF CORRECTION

PATENT NO. : 6,583,358 B1
DATED : June 24, 2003
INVENTOR(S) : Shotey et al.

It is certified that error appears in the above-identified patent and that said Letters Patent is hereby corrected as shown below:

<u>Column 9, line 63 through Column 12, line 12,</u>
Claims 3 through 9 and claims 11 through 20, should read as follows:

-- The apparatus of claim 1, wherein each tab of the first set of removable tabs and the second set of removable tabs is integral with the base. --

-- The cover plate of claim 3, wherein each tab of the first set of removable tabs is connected to the base by at least one grooved connector and each tab of the second set of removable tabs is connected to the base by at least one grooved connector. --

-- The cover plate of claim 1, wherein the first set aperture is shaped and positioned to receive a single round electrical socket and wherein the second set aperture is shaped and positioned to receive an electrical socket selected from the group consisting of a socket of a duplex outlet and a ground-fault circuit interrupt socket. --

-- The cover plate of claim 5, wherein the second set aperture is shaped and positioned to receive a socket of a duplex outlet. --

-- The cover plate of claim 5, wherein the second set aperture is shaped and positioned to receive a ground-fault circuit interrupt socket. --

-- The cover plate of claim 1, wherein the base further comprises a first side, a second side that is substantially nonparallel with the first side, at least one removable hinge member attached to the first side of the base, and at least one removable hinge member attached to the second side of the base; and wherein the cover plate further comprises a cover for mating with the base, the cover comprising a first side and a second side corresponding respectively to the first side of the base and the second side of the base, the cover further comprising at least one removable hinge member attached to the first side of the cover and adapted to mate with the at least one removable hinge member of the first side of the base, and at least one removable hinge member attached to the second side of the cover and adapted to mate with the at least one removable hinge member of the second side of the base. --

-- The cover plate of claim 1, wherein the base defines a head aperture that is shaped and positioned to receive the head of a fastener and a shank aperture that is shaped and positioned to receive the shank of the fastener, but not the head of the fastener. --

-- The cover plate of claim 10, wherein the first tab set periphery line and the second tab set periphery line intersect and wherein the first tab set periphery line and the third tab set periphery line intersect. --

-- The cover plate of claim 11, wherein the first tab set periphery line and the fourth tab set periphery line intersect. --

-- The cover plate of claim 10, wherein each tab of the first set of removable tabs is integral with the base and is connected to the base by at least one grooved connector, each tab of the second set of removable tabs is integral with the base and is connected to the base by at least one grooved connector, each tab of the third set of removable tabs is integral with the base and is connected to the base by at least one grooved connector, and each tab of the fourth set of removable tabs is integral with the base and is connected to the base by at least one grooved connector. --

UNITED STATES PATENT AND TRADEMARK OFFICE
CERTIFICATE OF CORRECTION

PATENT NO. : 6,583,358 B1
DATED : June 24, 2003
INVENTOR(S) : Shotey et al.

It is certified that error appears in the above-identified patent and that said Letters Patent is hereby corrected as shown below:

Column 9, line 63 through Column 12, line 12 (cont'd),

-- An electrical cover plate comprising:
a base comprising a planar member having a first side opposing a second side;
a first set of removable tabs comprising at least one removable tab which is integral with the planar member and is connected to the base by at least one grooved connector, so that removal of the first set of removable tabs forms a first set aperture that is shaped and positioned to receive an electrical device;
wherein the grooved connector comprises a groove in the first side of the planar member and an opposing groove in the second side of the planar member. --

-- The electrical cover plate of claim 14, wherein the removable tabs having a thickness and the groove on the first side of the planar member having a depth equal to between 40% and 50% of the thickness of the removable tabs. --

-- The electrical cover plate of claim 14, wherein the removable tabs having a thickness and the groove on the second side of the planar member having a depth equal to between 20% and 40% of the thickness of the removable tabs. --

-- The electrical cover plate of claim 14, wherein the removable tabs having a thickness and at least one of the groove on the first side and the groove on the second side having a depth equal to between 20% and 50% of the thickness of the removable tabs. --

-- The electrical cover plate of claim 14, further comprising:
a second set of removable tabs comprising at least one removable tab which is integral with the planar member and is connected to the base by at least one grooved connector, so that removal of the second set of removable tabs forms a second set aperture that is shaped and positioned different from the first set aperture to receive an electrical device, wherein the grooved connector comprises a groove in the first side of the planar member and an opposing groove in the second side of the planar member; and
the first set of removable tabs being bounded by a first tab set periphery line and the second set of removable tabs being bounded by a second tab set periphery line;
wherein the first tab set periphery line and the second tab set periphery line intersect. --

UNITED STATES PATENT AND TRADEMARK OFFICE
CERTIFICATE OF CORRECTION

PATENT NO.     : 6,583,358 B1
DATED          : June 24, 2003
INVENTOR(S)    : Shotey et al.

It is certified that error appears in the above-identified patent and that said Letters Patent is hereby corrected as shown below:

Column 9, line 63 through Column 12, line 12 (cont'd),

-- The cover plate of claim 11, wherein the base further comprises a first side, a second side that is substantially nonparallel with the first side, at least one removable hinge member attached to the first side of the base, and at least one removable hinge member attached to the second side of the base; and wherein the cover plate further comprises a cover for mating with the base, the cover comprising a first side and a second side corresponding respectively to the first side of the base and the second side of the base, the cover further comprising at least one removable hinge member attached to the first side of the cover and adapted to mate with the at least one removable hinge member of the first side of the base, and at least one removable hinge member attached to the second side of the cover and adapted to mate with the at least one removable hinge member of the second side of the base. --

-- The cover plate of claim 11, wherein the base defines a head aperture that is shaped and positioned to receive the head of a fastener and a shank aperture that is shaped and positioned to receive the shank of the fastener, but not the head of the fastener.

Signed and Sealed this

Twenty-fifth Day of November, 2003

JAMES E. ROGAN
*Director of the United States Patent and Trademark Office*